US008948033B2

(12) United States Patent
Nagasaka

(10) Patent No.: US 8,948,033 B2
(45) Date of Patent: Feb. 3, 2015

(54) COMMUNICATION SYSTEM, COMMUNICATION APPARATUS, AND RING NETWORK MONITORING METHOD

(75) Inventor: Seishi Nagasaka, Kanagawa (JP)

(73) Assignee: Fujitsu Telecom Networks Limited, Kanagawa (JP)

(*) Notice: Subject to any disclaimer, the term of this patent is extended or adjusted under 35 U.S.C. 154(b) by 327 days.

(21) Appl. No.: 13/045,203

(22) Filed: Mar. 10, 2011

(65) Prior Publication Data

US 2012/0106369 A1     May 3, 2012

(30) Foreign Application Priority Data

Nov. 1, 2010 (JP) .................................. 2010245019

(51) Int. Cl.
    *H04L 12/26*     (2006.01)
(52) U.S. Cl.
    CPC ............ *H04L 43/0811* (2013.01); *H04L 43/10* (2013.01)
    USPC ........... 370/252; 709/224; 370/242; 370/250; 370/222
(58) Field of Classification Search
    USPC .............. 370/241.1, 250, 252, 223, 352, 222, 370/230, 256, 242; 709/224; 705/8
    See application file for complete search history.

(56) References Cited

U.S. PATENT DOCUMENTS

| 5,224,149 | A * | 6/1993 | Garcia ........................ 379/22.01 |
| 2007/0223388 | A1 * | 9/2007 | Arad et al. ..................... 370/252 |
| 2008/0126536 | A1 * | 5/2008 | Sakurai ......................... 709/224 |
| 2008/0232261 | A1 * | 9/2008 | Tsuzaki et al. ................. 370/250 |
| 2009/0292575 | A1 * | 11/2009 | Ellebracht et al. ................ 705/8 |
| 2011/0292789 | A1 * | 12/2011 | Long et al. ..................... 370/222 |
| 2012/0026894 | A1 * | 2/2012 | Akahane et al. ............. 370/242 |

FOREIGN PATENT DOCUMENTS

| JP | 2002-152317 | 5/2002 |
| JP | 2002-271353 | 9/2002 |
| JP | 2008-136013 | 6/2008 |
| JP | 2009-060418 | 3/2009 |
| WO | 2008/114364 | 9/2008 |

OTHER PUBLICATIONS

Office action dated Oct. 29, 2013 from corresponding Japanese Patent Application No. 2010-245019 and its English summary by the clients.

* cited by examiner

*Primary Examiner* — Andrew Lai
*Assistant Examiner* — Jamaal Henson
(74) *Attorney, Agent, or Firm* — Ladas & Parry, LLP

(57) ABSTRACT

A communication apparatus forming a ring network sends a test frame that is not designed to be discarded at a block point in the ring network established to discard the user frame and that is configured to have a data size randomly selected from the data sizes permitted for the user frame, from a first communication port connected to a transfer channel in a first direction in the ring network. The communication apparatus determines that the transfer status of the user frame in the ring network is normal when the sent test frame is received via a second communication port connected to a transfer channel in a second direction in the ring network in a predetermined manner.

21 Claims, 9 Drawing Sheets

COMMUNICATION SYSTEM 100

COMMUNICATION SYSTEM 100

| SEQUENCE NUMBER | TYPE | ORIGINATION TS | RECEPTION TS | RTT DETERMI- NATION | CONTENT DETERMI- NATION | VERIFI- CATION RESULT |
|---|---|---|---|---|---|---|
| 00001-B | NON-PASS | 9:30:31.035 | TIMEOUT | — | — | OK |
| 00001-A | PASS | 9:30:31.105 | 9:30:31.822 | OK | OK | OK |
| 00002-B | NON-PASS | 9:30:33.080 | TIMEOUT | — | — | OK |
| 00002-A | PASS | 9:30:33.111 | 9:30:33.722 | OK | OK | OK |
| ⋮ | ⋮ | ⋮ | ⋮ | ⋮ | ⋮ | ⋮ |
| 03601-B | NON-PASS | 11:30:31.036 | TIMEOUT | — | — | OK |
| 03601-A | PASS | 11:30:31.100 | TIMEOUT | NG | — | NG |

24

| SEQUENCE NUMBER | TYPE | PASS TS | DISCARD TS |
|---|---|---|---|
| 00001-B | NON-PASS | — | 9:30:31.300 |
| 00001-A | PASS | 9:30:31.340 | — |
| 00002-B | NON-PASS | — | 9:30:33.280 |
| 00002-A | PASS | 9:30:33.311 | — |
| ⋮ | ⋮ | ⋮ | ⋮ |

| SEQUENCE NUMBER | TYPE | PARENT NODE | | | | | ROUTE NODE #1 | | | | ROUTE NODE #2 | | | ... |
|---|---|---|---|---|---|---|---|---|---|---|---|---|---|---|
| | | ORIGINATION TS | RECEPTION TS | RTT DETERMINATION | CONTENT DETERMINATION | VERIFICATION RESULT | APPARATUS ID | PASS TS | DISCARD TS | APPARATUS ID | PASS TS | DISCARD TS | |
| 00001-B | NON-PASS | 9:30:31.035 | TIMEOUT | — | — | OK | COMMUNICATION APPARATUS 18 | 9:30:31.185 | — | COMMUNICATION APPARATUS 16 | — | 9:30:31.205 | |
| 00001-A | PASS | 9:30:31.105 | 9:30:31.822 | OK | OK | OK | COMMUNICATION APPARATUS 18 | 9:30:31.200 | — | COMMUNICATION APPARATUS 16 | 9:30:31.220 | — | |
| 00002-B | NON-PASS | 9:30:33.080 | TIMEOUT | — | — | OK | COMMUNICATION APPARATUS 18 | 9:30:33.250 | — | COMMUNICATION APPARATUS 16 | — | 9:30:33.310 | |
| 00002-A | PASS | 9:30:33.111 | 9:30:33.722 | OK | OK | OK | COMMUNICATION APPARATUS 18 | 9:30:33.275 | — | COMMUNICATION APPARATUS 16 | 9:30:33.295 | — | |
| ... | | ... | | | | | | ... | | | ... | | ... |
| 03601-B | NON-PASS | 11:30:31.036 | TIMEOUT | — | — | OK | COMMUNICATION APPARATUS 18 | 11:30:31.216 | — | COMMUNICATION APPARATUS 16 | — | 11:30:31.336 | |
| 03601-A | PASS | 11:30:31.100 | TIMEOUT | NG | — | NG | COMMUNICATION APPARATUS 18 | 11:30:31.290 | — | — | — | — | |

24

COMMUNICATION SYSTEM, COMMUNICATION APPARATUS, AND RING NETWORK MONITORING METHOD

CROSS-REFERENCE TO RELATED APPLICATIONS

This application claims priority to Japanese Patent Application No. 2010-245019 filed on Nov. 1, 2010 the disclosures of which is incorporated herein by reference.

BACKGROUND OF THE INVENTION

1. Field of the Invention

The present invention relates to data communication techniques and particularly to communication systems adapted to transfer data in a ring network, communication apparatuses forming a ring network, and method of monitoring a ring network.

2. Description of the Related Art

As a highly-reliable communication network, a ring network in which multiple communication apparatuses are connected in a ring topology is often built. The idea of "blockage" is introduced in a ring network in order to prevent a loop of communication frames. More specifically, a point where all communication frames are discarded (hereinafter, also referred to as "block point") is provided in a ring network.
[patent document No. 1] 2002-271353

Known methods of verifying the normality (health) of a ring network include Ethernet OAM ("Ethernet" is a registered trade mark) standardized by the ITU-T Recommendation Y.1731 and IEEE802.1ag, or the use of a predetermined monitoring communication frame. All of the known methods are capable of verifying the normality only in a limited range, and the content of communication frames for verification is fixed. We considered that there is room for improvement in the precision of verifying the normality of a ring network.

SUMMARY OF THE INVENTION

The present invention addresses the aforementioned issue and a purpose thereof is to provide a technology of improving the precision of the verifying the normality of a ring network.

The communication system that addresses the issue is provided with a plurality of communication apparatuses and configured such that a user frame sent from a user apparatus is transferred in a ring network connecting the plurality of communication apparatuses in a ring topology, wherein selected one or more of the plurality of communication apparatuses comprise: a test frame sending unit configured to send a test frame that is not designed to be discarded at a block point in the ring network established to discard the user frame and that is configured to have a data size randomly selected from the data sizes permitted for the user frame, from a first communication port connected to a transfer channel in a first direction in the ring network; and a determination unit configured to determine that the transfer status of the user frame in the ring network is normal when the sent test frame is received via a second communication port connected to a transfer channel in a second direction in the ring network in a predetermined manner.

Another embodiment of the present invention relates to a communication apparatus. The communication apparatus is one of a plurality of communication apparatuses connected in a ring topology in a ring network adapted to transfer a user frame sent from a user apparatus, and comprises: a test frame sending unit configured to send a test frame that is not designed to be discarded at a block point in the ring network established to discard the user frame and that is configured to have a data size randomly selected from the data sizes permitted for the user frame, from a first communication port connected to a transfer channel in a first direction in the ring network; and a determination unit configured to determine that the transfer status of the user frame in the ring network is normal when the sent test frame is received via a second communication port connected to a transfer channel in a second direction in the ring network in a predetermined manner.

Still another embodiment of the present invention relates to a ring network monitoring method. The method comprises: sending, from selected one or more of the plurality of communication apparatuses connected in a ring topology in a ring network adapted to transfer a user frame sent from a user apparatus, a test frame that is not designed to be discarded at a block point in the ring network established to discard the user frame and that is configured to have a data size randomly selected from the data sizes permitted for the user frame, using a first communication port connected to a transfer channel in a first direction in the ring network; and determining, in the selected one or more communication apparatuses, that the transfer status of the user frame in the ring network is normal when the sent test frame is received via a second communication port connected to a transfer channel in a second direction in the ring network in a predetermined manner.

Optional combinations of the aforementioned constituting elements, and implementations of the invention in the form of apparatuses, methods, systems, programs, and storage mediums storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 12 shows an example of monitoring information stored in the monitoring information storage according to the second embodiment.

DETAILED DESCRIPTION OF THE INVENTION

The invention will now be described by reference to the preferred embodiments. This does not intend to limit the scope of the present invention, but to exemplify the invention.

First Embodiment

Figure 1:
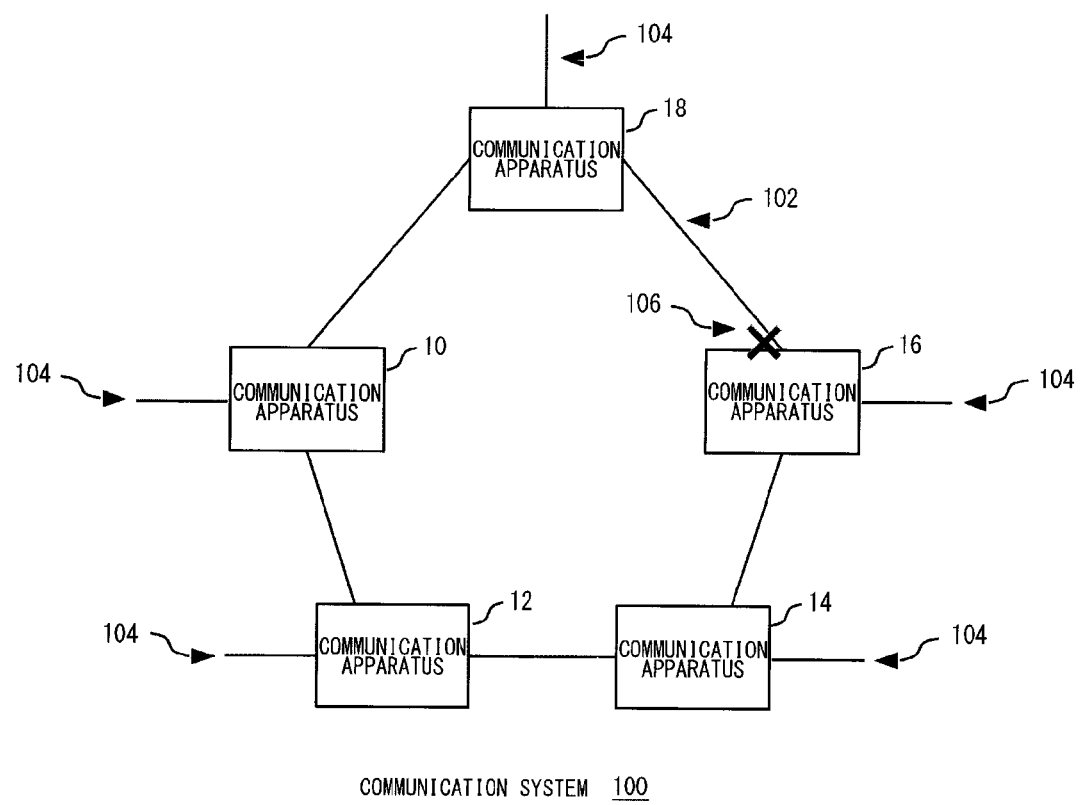
FIG. 1 shows the configuration of a communication system according to the first embodiment of the invention.

FIG. 1 shows the configuration of a communication system 100 according to the first embodiment of the invention (hereinafter, also referred to as the first embodiment). The communication system 100 is configured such that Ethernet frames (hereinafter, referred to as "user frames") sent from, for example, the PC of an external user (e.g., client or end user) are transferred in a ring network connecting communication apparatuses 10-18 in a ring topology using transfer channels. It is assumed that the ring network according to the first embodiment is a Layer-2 network.

For example, each of the communication apparatuses 10-18 is a Layer-2 switch or a bridge adapted to route user frames in accordance with address information (e.g., destination MAC address) contained in the user frame. Each of the communication apparatuses 10-18 is connected to a ring network transfer channel 102, which is a transfer channel in the ring network, and to a trans-ring transfer channel 104, which is a transfer channel outside the ring network. For example, the communication apparatus is connected to the PC of a user or a monitoring terminal via the trans-ring transfer channel 104.

FIG. 1 shows that a block point 106 is established in a communication port in the communication apparatus 16 interfacing the communication apparatus 18. All user frames are discarded at the block point 106. In other words, transfer of user frames is blocked in the block point 106. In the following description, the clockwise direction in FIG. 1 will be referred to as the "first direction" of the ring network for the communication apparatus, and the counterclockwise direction will be referred to as the "second direction".

A problem with the related-art method of monitoring the transfer status of communication frames in a ring network will be described with reference to FIG. 1. A description will now be given of prerequisite knowledge of the transition of a block point. When a failure occurs in the ring of a ring network, the point of failure is designated as a new block point and blockage at the block point hitherto established is canceled, thereby changing the transfer route for communication frames and continuing communication accordingly.

For example, in the event that a failure occurs in the ring network transfer channel 102 between the communication apparatuses 12 and 14, a new block point 106 is set in at least one of the communication port of the communication apparatus 12 interfacing the communication apparatus 14 and the communication port of the communication apparatus 14 interfacing the communication apparatus 12. Along with this, the block point 106 established in the communication apparatus 16 is removed (invalidated). As a result of transition of the block point 106, user frames sent from the communication apparatus 18 in the second direction and transferred to the communication apparatus 10, the communication apparatus 12, and the communication apparatus 14 are sent from the communication apparatus 18 in the first direction and transferred to the communication apparatuses 16 and 14.

Normally, all the communication frames are discarded at the block point 106. Therefore, the normality of the ring network across the block point 106, i.e., the normality of transfer status over a segment in which communication frames had not been transferred due to the block point 106 (e.g., the segment between the communication apparatuses 16-18, which may be referred to an out-of-operation route) is known only when the block point 106 is caused to make a transition to another location. When a failure in the out-of-operation route is known after the transition of the block point 106, there arises a need to establish a new alternative route with the result that a long period of time may be required before the failure is corrected in the ring network.

Related-art methods for verifying the normality of a transfer channel include Ethernet OAM, etc. All of these methods use a monitoring frame with a fixed frame size and a prefixed payload content. Moreover, the related-art methods are capable of verifying only the transfer route that does not go beyond the block point. Therefore, exhaustiveness and precision of monitoring the normality of a ring network are not satisfactory.

In this background, the first embodiment requires transferring a monitoring Ethernet frame which is configured to pass the block point and in which the data size and payload content are randomly configured (hereinafter, also referred to as "pass test frame") and periodically monitoring the transfer status over the entirety of the ring network across the block point. Further, a monitoring Ethernet frame configured to be discarded at a block point (hereinafter, also referred to as "non-pass test frame") is transferred to monitor the normality of frame discarding at the block point. Thus, by verifying the transfer status of both a pass test frame and a non-pass test frame, exhaustiveness and precision of normality monitoring of a ring network are improved. A pass test frame and a non-pass test frame may be generically referred to as "test frames".

In the communication system 100 according to the first embodiment, the communication apparatus 10 configures a test frame on its own, sending the frame in the first direction in the ring network. The communication apparatus 10 is also referred to as a "parent node". Meanwhile, the communication apparatuses 12-18 do not configure a test frame on their own and route test frames sent by the communication apparatus 10. These communication apparatuses will be referred to as "route nodes". For example, a pass test frame is routed using a route passing through the communication apparatus 10, the communication apparatus 18, the communication apparatus 16, the communication apparatus 14, the communication apparatus 12, and the communication apparatus 10. The configuration of a parent node and a route node will be described in detail below.

Figure 2:
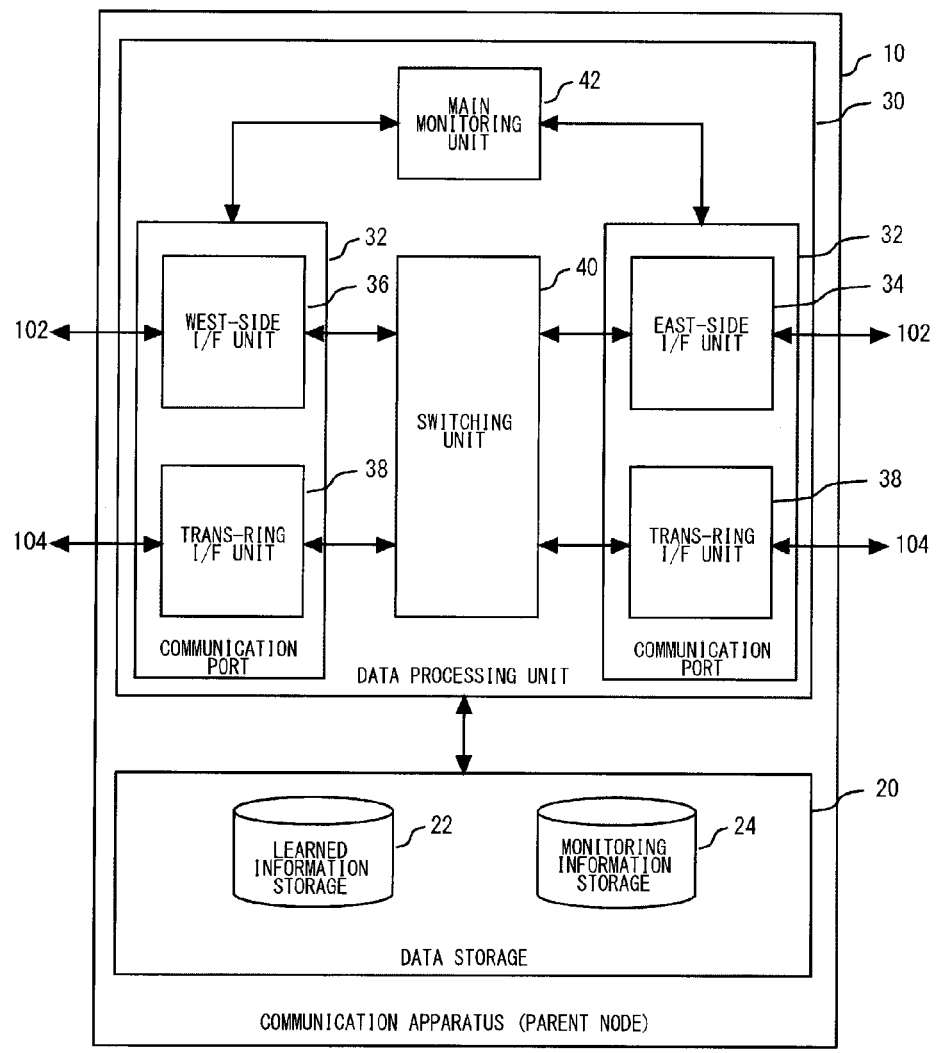
FIG. 2 shows the functional configuration of the parent node according to the first embodiment.

FIG. 2 shows the functional configuration of the parent node according to the first embodiment, i.e., the communication apparatus 10 of FIG. 1. The communication apparatus 10 comprises a data storage 20 for storing data and a data processing unit 30 for processing data (e.g., transfer of a communication frame). The data storage 20 comprises a learned information storage 22 and a monitoring information storage 24. The data processing unit 30 comprises a communication port 32, a switching unit 40, and a main monitoring unit 42.

The learned information storage 22 is a storage area that stores learned information defining the correspondence between the destination MAC address contained in an Ethernet frame and the output port of the frame. The monitoring information storage 24 is a storage area that stores information indicating the status of monitoring the ring network using test frames (hereinafter, referred to as "monitoring information"). The configuration of monitoring information will be described later with reference to FIG. 4.

The communication port 32 is connected to the ring network transfer channel 102 or the trans-ring transfer channel 104, acquires a user frame from the connected transfer channel, and sends the frames to the switching unit 40. The communication port 32 also sends a user frame transferred from the switching unit 40 to the connected transfer channel. The communication port 32 includes an EAST-side I/F unit 24, a WEST-side I/F unit 36, and a trans-ring I/F unit 38. The trans-ring IF unit 38 is a communication port connected to the trans-ring transfer channel 104.

The EAST-side I/F unit 34 is a communication port connected to the ring network transfer channel 102 in the first direction in the ring network. When the EAST-side I/F unit 34 receives a test frame from the main monitoring unit 42, the unit 34 sends the test frame to the ring network transfer channel 102. When the unit 34 receives a test frame from the switching unit 40, the unit 34 transfers the test frame to the main monitoring unit 42. The latter test frame is a test frame that is sent from the EAST-side I/F unit 34 and that went around the ring network. The WEST-side I/F unit 36 is a communication port connected to the ring network transfer channel 102 in the direction in the ring network. When the WEST-side I/F unit 36 acquires a test frame via the ring network transfer channel 102 (i.e., the test frame sent from the EAST-side I/F unit 34 and that went around the ring network), the unit 36 transfers the test frame to the switching unit 40.

The switching unit 40 transfers the user frame received at the communication port 32 to the communication port 32 defined as an output port in accordance with the learned information. More specifically, when the destination MAC address contained in the user frame is recorded in the learned information, the unit 40 transfers the user frame only to the communication port 32 mapped into the MAC address in the learned information. Meanwhile, when the destination MAC address of the user frame is not recorded in the learned information, the unit 40 transfers the user frame to all of the communication ports 32 other than the receiving port (flooding). When the switching unit 40 receives a test frame containing the MAC address of the EAST-side I/F unit 34 as the destination MAC address, the unit 40 transfers the test frame only to the EAST-side I/F unit 34.

Figures 3, 4:
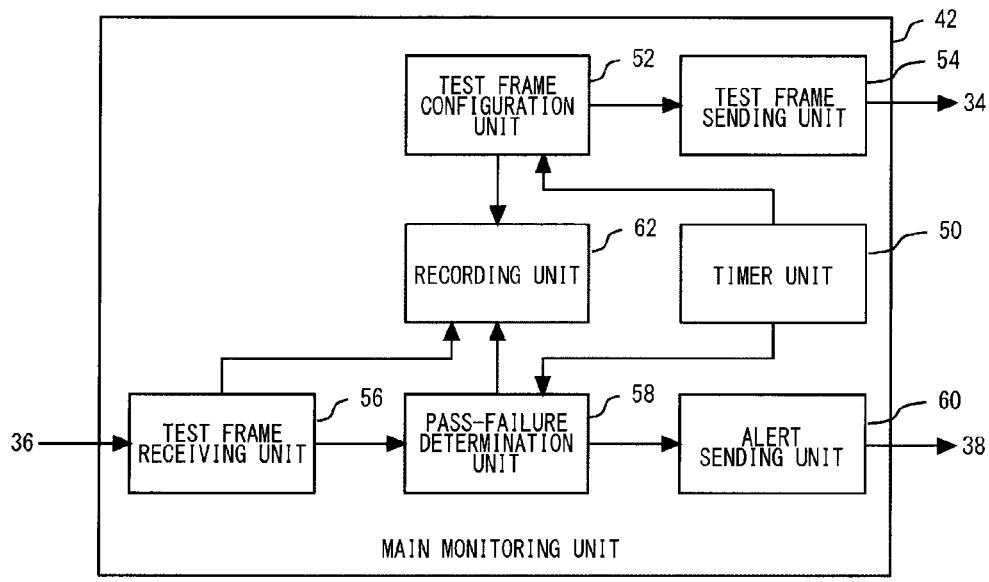
FIG. 3 is a block diagram showing the main monitoring unit of FIG. 2 in further detail.
FIG. 4 is an example of monitoring information stored in the monitoring information storage of FIG. 2.

The main monitoring unit 42 performs a ring network monitoring process of a parent node. FIG. 3 is a block diagram showing the main monitoring unit 42 of FIG. 2 in further detail. The man monitoring unit 42 comprises a timer unit 50, a test frame configuration unit 52, a test frame sending unit 54, a test frame receiving unit 56, a pass-fail determination unit 58, an alert sending unit 60, and a recording unit 62.

The timer unit 50 communicates the timing of execution of processes to predetermined functional blocks. More specifically, each time the lapse of two seconds is detected, the unit 50 notifies the test frame configuration unit 52 that it is time to configure (or it is time to send) a test frame. Further, each time the lapse of one second is detected since the notification of the timing of configuring a test frame, the unit 50 notifies the pass-fail determination unit 58 that the time to wait for the test frame has expired (i.e., that a timeout has occurred). The intervals of "two seconds" and "one second" are by way of example only. The value of the intervals of configuring (sending) test frames and the value of the time to wait for the test frame may of course be appropriately determined according to the knowledge of the operator or experiments using the communication system 100.

When the test frame configuration unit 52 is notified by the timer unit 50 that it is time to configure a test frame, the unit 52 configures data for a pass test frame and a non-pass test frame. Upon configuring a pass test frame and a non-pass test frame, the test frame configuration unit 52 updates the monitoring information the monitoring information storage 24 using the recording unit 62. More specifically, the unit 52 records the ID for uniquely identifying the test frame (hereinafter, also referred to as "sequence number"), type of the test frame (pass or non-pass), and time and date of sending the test frame (hereinafter, also referred to as "origination time stamp") in the monitoring information.

The test frame configuration unit 52 configures the header of the pass test frame such that the MAC address of the outgoing port of the local apparatus (in this case, the EAST-side I/F unit 34) is indicated as the source MAC address and the destination MAC address. The unit 52 further places a predetermined bit sequence in a type field to indicate that the frame is a pass test frame. This allows the pass test frame to be sent from the EAST-side I/F unit 34 in the first direction in the ring network, to go around the ring network, and to be transferred to the EAST-side I/F unit 34 of the source apparatus. In other words, the entire segment covering the EAST-side I/F unit 34, the ring network including one or more route nodes, the WEST-side I/F unit 36, the switching unit 40, and the EAST-side I/F unit 34 is subject to monitoring so that the communication system 100 can be monitored exhaustively.

The test frame configuration unit 52 configures the payload of the pass test frame, first by randomly defining the data size of the payload within a range of data size permitted for a user frame. For example, if a data size between the minimum of 64 bytes and 15000 bytes, i.e., the size of a jumbo frame, is permitted for a user frame, the unit 52 randomly defines the data size in the range between 64-15000 bytes. The unit 52 may select a data size of a range of jumbo frames in excess of 1518 bytes at a certain frequency or higher.

The unit 52 then randomly configures the pattern of the bit sequence in the payload of the pass test frame. For example, the unit 52 may generate a pseudo random bit sequence of the payload size determined earlier and places the generated sequence in the payload. Alternatively, the unit 52 may randomly select from an all-0 bit sequence, all-1 bit sequence, or a bit sequence in which 0 and 1 alternate. Still alternatively, the unit 52 may randomly select from multiple candidates of bit sequences permitted for the payload of a user frame, extract a bit sequence of the payload size determined earlier from the selected candidate, and place the extracted sequence in the payload data.

The test frame configuration unit 52 configures a non-pass test frame similarly as a pass test frame. The unit 52 configures the header of a non-pass test frame by placing a predetermined bit sequence in a type field to indicate that the frame is a non-pass test frame.

The payload of each of a pass test frame and a non-pass test frame includes a sequence number. The sequence number is of a format "identification number+"−"+"A" (in the case of pass test frame) or "B" (in the case of a non-pass test frame). The pass test frame and the non-pass test frame configured at the same time are assigned the same identification number. In other words, these frames differ only in the notation at the end, i.e., A or B.

The test frame sending unit 54 sends the data for the pass test frame and the non-pass test frame to the EAST-side I/F unit 34, causing the EAST-side I/F unit 34 to send the frame to the ring network transfer channel 102. To facilitate the transfer of the non-pass test frame in advance of the pass test frame in the ring network, the unit 54 sends the non-pass test frame first and then sends the pass test frame.

The test frame receiving unit 56 receives the test frame transferred from the EAST-side I/F unit 34. If the ring network is in a normal state, the unit 56 receives only the pass test frame. The test frame receiving unit 56 records the time and date of receiving the test frame (hereinafter, also referred to as "reception time stamp") in the monitoring information in the monitoring information storage 24 using the recording unit 62.

The pass-failure determination unit 58 determines the normality of transfer status in the ring network in accordance with the status of receiving the test frame in the test frame receiving unit 56, namely, the status of receiving the test frame from an apparatus in the second direction in the ring network. Details of the determination will be given later. The pass-failure determination unit 58 records the result of determination on the normality of the ring network in the monitoring information in the monitoring information storage 24 using the recording unit 62.

When the pass-failure determination unit 58 determines that the transfer status in the ring network is abnormal, the alert sending unit 60 notifies a predetermined monitoring terminal accordingly. For example, the unit 60 sends an Ethernet frame indicating that the transfer status in the ring network is abnormal to the trans-ring I/F unit 38, alerting the monitoring terminal connected via the trans-ring transfer channel 104. The recording unit 62 receives an update to the monitoring information from the test frame configuration unit 52, the test frame receiving unit 56, the pass-failure determination unit 58, and records the update in the monitoring information in the monitoring information storage 24.

FIG. 4 is an example of monitoring information stored in the monitoring information storage 24 of FIG. 2. The sequence number column in the figure stores the sequence number of the test frame, and the type column stores flag data indicating whether the frame is a pass test frame or a non-pass test frame. The origination TS column stores the origination time stamp, the reception TS column stores the reception time stamp, and the RTT determination column, content determination column, and verification result column store results of determination on the transfer status in the ring network.

A detailed description of the determination by the pass-failure determination unit 58 on the transfer status in the ring network will now be given by referring to FIG. 4. When the test frame receiving unit 56 does not receive the non-pass test frame send from the local apparatus before the time to wait for the test frame (e.g., one second) expires, a determination is made that the transfer status of user frames in the ring network is normal. In other words, when the EAST I/F unit 34 sends the non-pass test frame that should be discarded at the block point in the ring network and does not acquire the non-pass test frame that went around the ring network from the switching unit 40, a determination is made that the transfer status of user frames in the ring network is normal. A determination is due because the block point is operating properly in the ring network. Conversely, when the non-pass test frame is received, the transfer status in the ring network is determined to be abnormal.

When the test frame receiving unit 56 receives the pass test frame sent from the local apparatus before the time to wait for the test frame (e.g., one second) expires, namely, when the EAST-side I/F unit 34 acquires the pass test frame that is sent from the EAST-side I/F unit 34 and that went around the ring network, a determination is made that the round trip time (RTT) is normal (RTT determination in FIG. 4). Further, when the payload of the pass test frame sent matches that of the pass test frame received, a determination is made that the payload of the pass test frame received is normal (content determination in FIG. 4). When both the result of RTT determination and the result of content determination are normal, the pass-failure determination unit 58 determines that the transfer status of user frames in the ring network is normal (verification result of FIG. 4). For example, referring to FIG. 4, the RTT of the pass test frame "03601-A" exceeds the wait time so that the RTT determination is negative and the ultimate verification result is NG.

Figure 5:
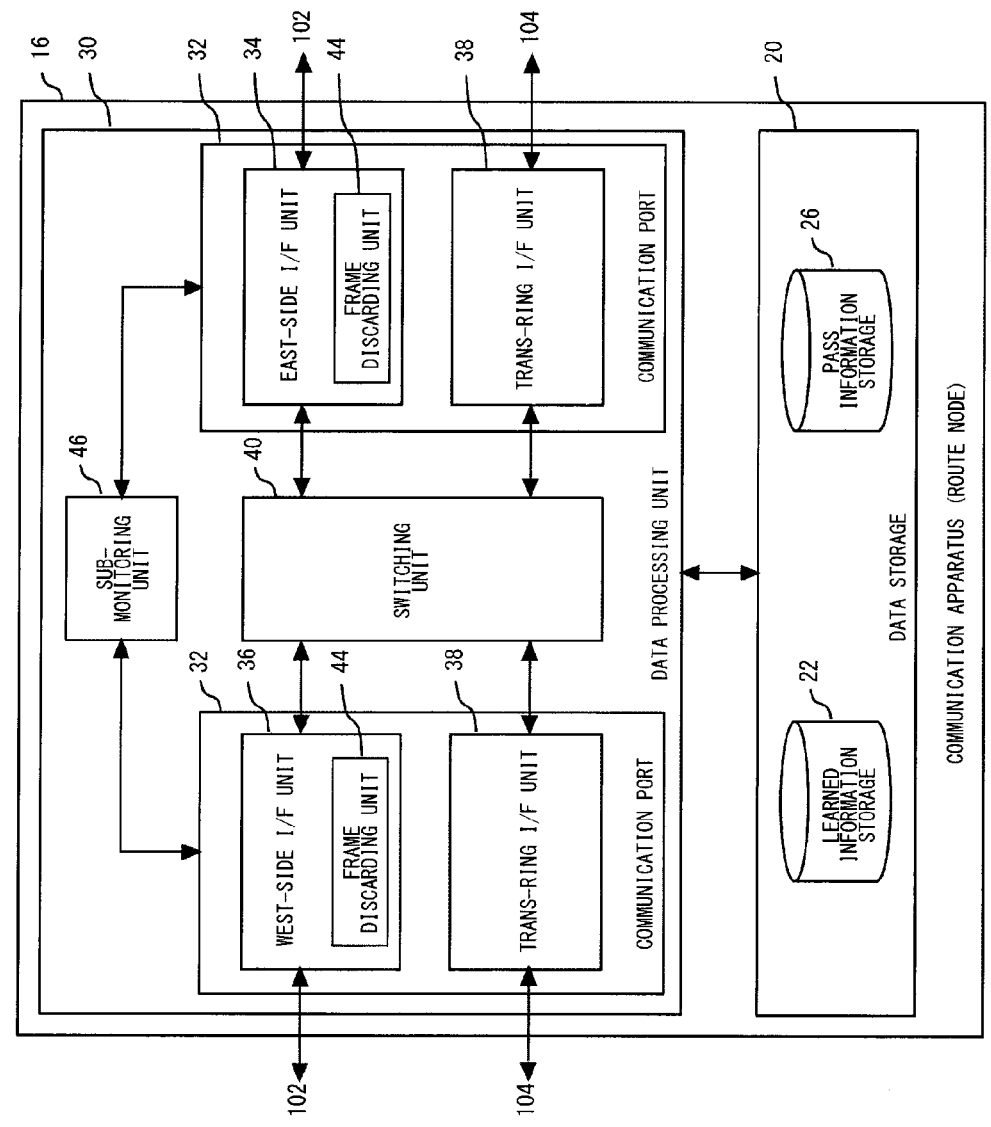
FIG. 5 a block diagram showing the functional blocks of the route node according to the first embodiment.

FIG. 5 a block diagram showing the functional blocks of the route node according to the first embodiment, i.e., the communication apparatus 16 of FIG. 1. The functional blocks of FIG. 5 that are identical to or corresponding to the functional bocks shown in FIG. 2 are indicated by the same reference symbols as in FIG. 2. Description of the features of the functional blocks already described is omitted from the description given below. The other route nodes, i.e., the communication apparatuses 12, 14, and 18 include the same functional blocks as the communication apparatus 16.

The communication apparatus 16 is provided with a pass information storage 26 in place of the monitoring information storage 24 in the communication apparatus 10, a parent node. Further, the apparatus 16 is provided with a sub-monitoring unit 46 in place of the main monitoring unit 42 in the communication apparatus 10. Further, the EAST-side I/F unit 34 and the WEST-side I/F unit 36 include a frame discarding unit 44.

The learned information storage 22 stores learned information indicating that the output port of the test frame in which the communication port of the parent node (in this case, the EAST-side I/F unit 34) is designated as the destination MAC address should b output to the communication port connected to an apparatus in the first direction in the ring network (in this case, the EAST-side I/F unit 34 of the communication apparatus 16). This prevents flooding from occurring in routing test frames so that the test frames can be routed efficiently. The pass information storage unit 26 is a storage area for storing information indicating the pass status and the discard status of the test frame (hereinafter, also referred to as "pass information"). The configuration of pass information will be described later by referring to FIG. 7.

The EAST-side I/F unit 34 and the WEST-side I/F unit 36 identify the value contained in the type field of the header of the Ethernet frame that should be sent to the ring network transfer channel 102. The units identify whether the Ethernet frame that should be sent is a pass test frame, a non-pass test frame, or a user frame (Ethernet frame other than a test frame) in accordance with the type value.

When the EAST-side I/F unit 34 or the WEST-side I/F unit 36 send the pass test frame or the non-pass test frame to the ring network transfer channel 102, the unit communicates the pass information update indicating the fact to the sub-monitoring unit 46. The update to the pass information includes the sequence number and type of the test frame, and the time, and date of sending the test frame (in other words, the time and date of passing the frame and hereinafter also referred to as "pass time stamp"). According to the first embodiment, the test frame is transferred in the first direction in the ring network so that the entity sending the test frame is the EAST-side I/F unit 34.

The frame discarding unit 44 implements the block point in the ring network by discarding an Ethernet frame, i.e., by blocking the transfer. More specifically, when the blocking function is disabled, all Ethernet frames received by the EAST-side I/F unit 34 or the WEST-side I/F unit 36 are passed.

Meanwhile, when the blocking function is enabled, distinction is made between whether the Ethernet frame is a pass test frame, a non-pass test frame, or a user frame in accordance with the type value of the Ethernet frame received by the EAST-side I/F unit 34 or the WEST-side I/F unit 36. The pass test frame is passed directly, and the non-pass test frame and the user frame are discarded. In the case of the communication apparatus 16 of FIG. 1, the blocking function of the frame discarding unit 44 of the WEST-side I/F unit 36 is enabled and the blocking function of the frame discarding unit 44 of the EAST-side I/F unit 34 is disabled.

When the frame discarding unit 44 discards a non-pass test frame, the frame discarding unit 44 communicates an update to the pass information (hereinafter, also referred to as "discard information") indicating as such to the sub-monitoring unit 46. The update to the pass information includes the sequence number and type of the non-pass test frame, and the time and date of discarding the non-pass test frame (hereinafter also referred to as "discard time stamp"). Although not shown in FIG. 2, the EAST-side I/F unit 34 and the WEST-side I/F unit 36 of the communication apparatus 10, the parent node, may of course include the frame discarding unit 44.

Figures 6, 7:
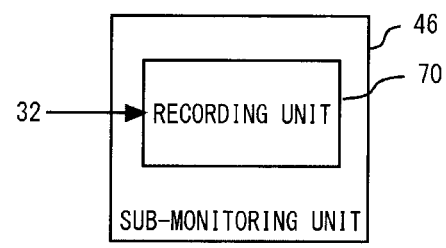
FIG. 6 is a block diagram showing the sub-processing unit of FIG. 5 in further detail.
FIG. 7 is an example of pass information stored in the pass information storage of FIG. 5.

The sub-monitoring unit 46 performs a ring network monitoring process of a route node. FIG. 6 is a block diagram showing the sub-processing unit 46 of FIG. 5 in further detail. The sub-monitoring unit 46 includes a recording unit 70. The recording unit 70 receives an update to the pass information from the EAST-side I/F unit 34, the WEST-side I/F unit 36, and the frame discarding unit 44 and records the update in the pass information in the pass information storage 26.

FIG. 7 is an example of pass information stored in the pass information storage 26 of FIG. 5. The sequence number field shown in the figure stores the sequence number of the test frame and the type field stores flag data indicating whether the frame is a pass test frame or a non-pass test frame. The pass TS column stores the pass time stamp and the discard TS column stores the discard time stamp.

Figure 8:
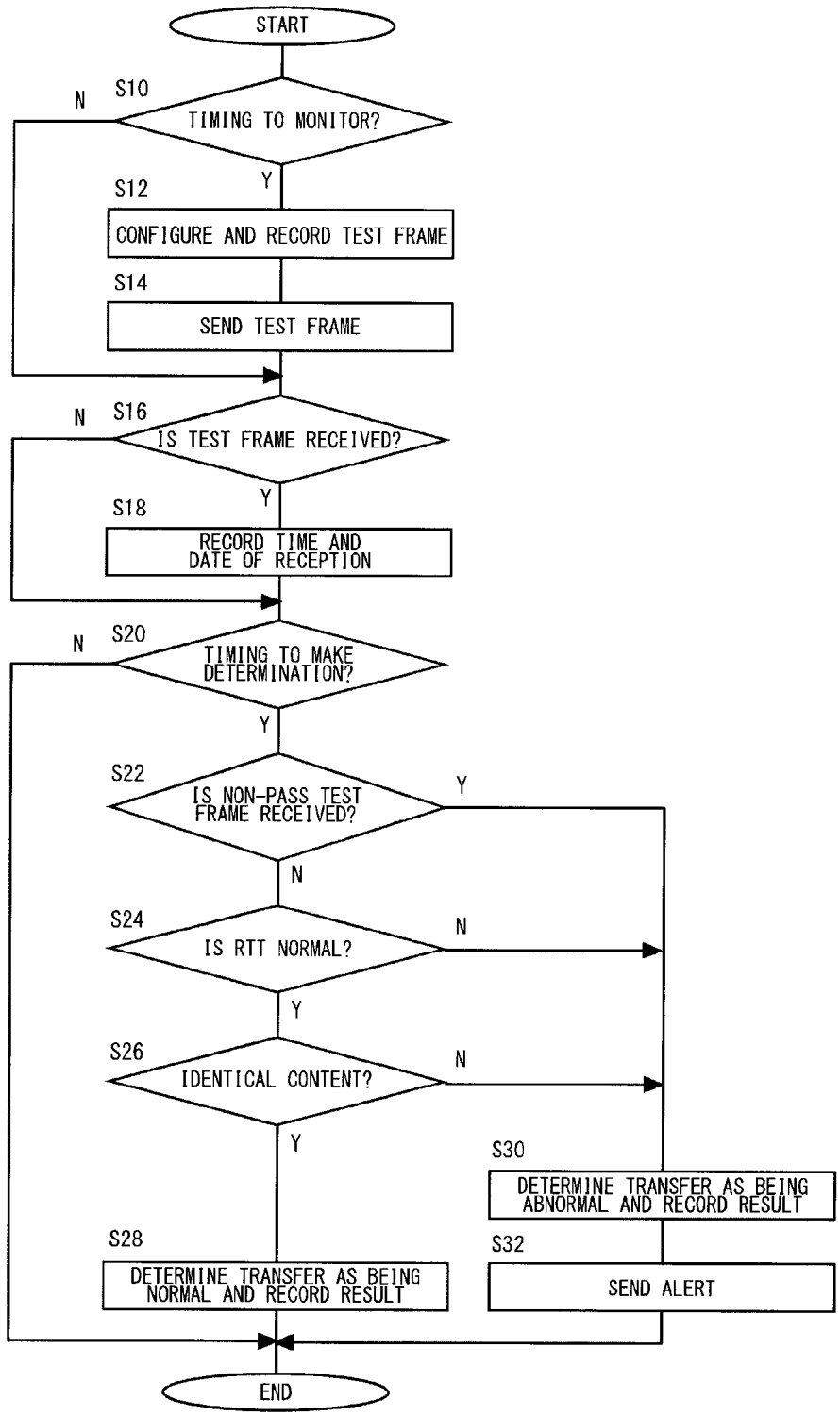
FIG. 8 is a flowchart showing the operation of the parent node according to the first embodiment.

The operation according to the configuration described above will be described below. FIG. 8 is a flowchart showing the operation of the parent node according to the first embodiment, i.e., the communication apparatus 10 of FIG. 1. When the test frame configuration unit 52 detects that it is time to monitor the ring network in accordance with the notification from the timer unit 50 (Y in S10), the test frame configuration unit 52 generates a pass test frame and a non-pass test frame in which the data size and bit sequence of the payload are randomly configured (S12). The unit 52 then records the origination time stamp of the test frames. The test frame sending unit 54 sends the pass test frame and the non-pass test frame from the EAST-side I/F unit 34 in the first direction in the ring network (S14). If it is not time to monitor the ring network (N in S10), S12 and S14 are skipped.

When the test frame receiving unit 56 receives the test frame acquired from an apparatus in the second direction in the ring network via the communication port 32 (Y in S16), the unit 56 records the reception time stamp of the test frame (S18). When the test frame is not received (N in S16), S18 is skipped. When the pass-failure determination unit 58 detects that it is time to make a determination in accordance with the notification from the timer unit 50 (Y in S20), the unit 58 refers to the monitoring information in the monitoring information storage 24 and starts the determination. When the non-pass test frame is not received (N in S22), and when the RTT of the pass test frame is within a predetermined range of wait time (Y in S24), and when the payload remains unchanged since the transmission (Y in S26), the pass-failure determination unit 58 determines that the transfer status in the ring network is normal. The unit 58 records the result of determination (S28).

When the non-pass test frame is received (Y in S22), or when the RTT exceeds a normal value (N in S24), or when the payload of the test frame is altered (N in S26), the pass-failure determination unit 58 determines that the transfer status in the ring network is abnormal and records the result of determination (S30). Along with this, the alert sending unit 60 sends an alert indicating that the transmission state in the ring network is abnormal to an external monitoring terminal (S32). If it is not time to determine the transfer status in the ring network (N in S20), S22-S32 are skipped and the flow shown in the figure is terminated.

FIG. 8 shows the operation related to the monitoring of the ring network. Although not shown in FIG. 8, the communication apparatus 10 operates as an ordinary Layer-2 switch by routing user frames in parallel to the monitoring of the ring network using test frames.

Figure 9:
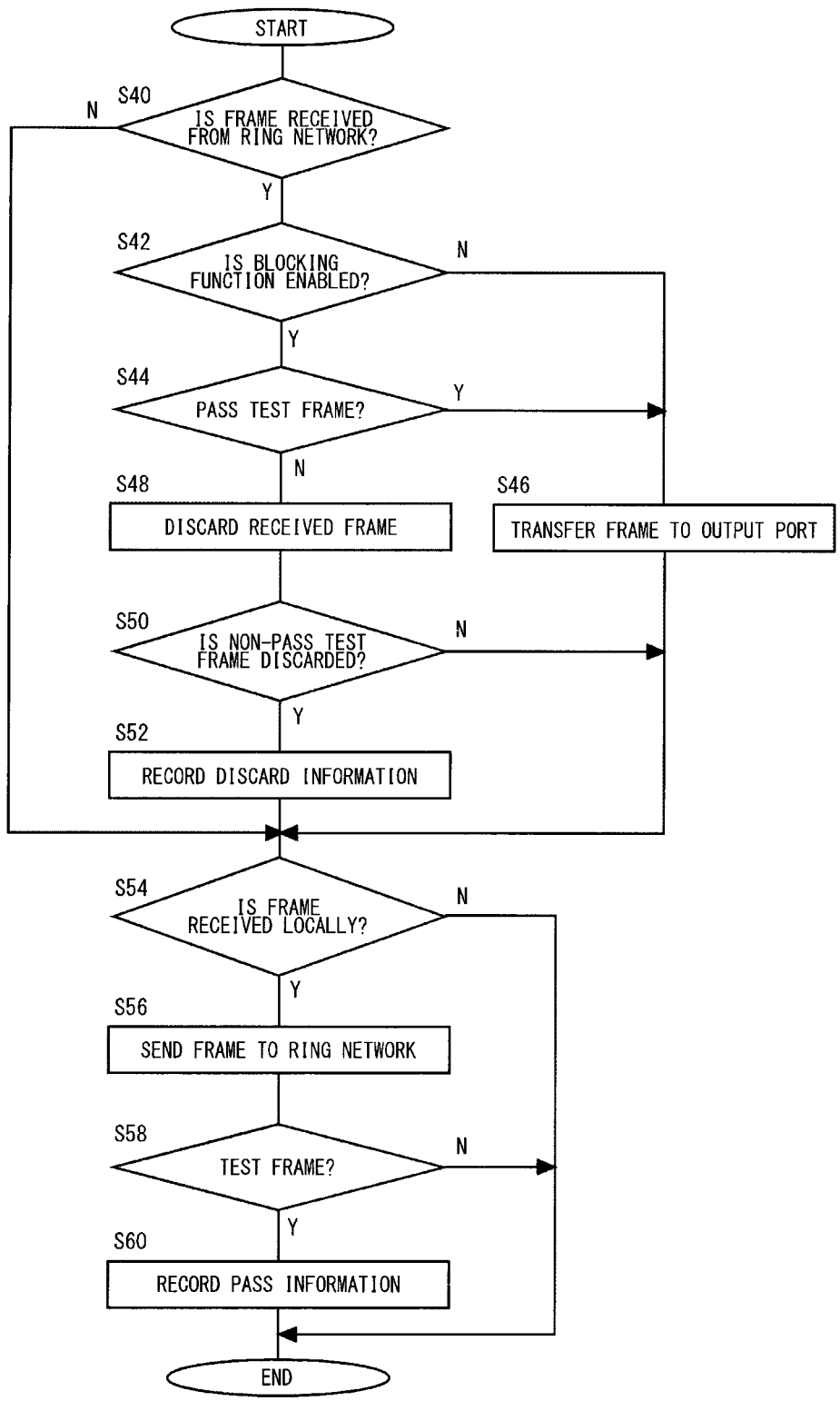
FIG. 9 is a flowchart showing the operation of the route node according to the first embodiment.

FIG. 9 is a flowchart showing the operation of the route node according to the first embodiment, i.e., the communication apparatuses 12-16 of FIG. 1. When the EAST-side I/F unit 34 or the WEST-side I/F unit 36 (also referred to as "receiving ports" in this paragraph) acquires an Ethernet frame from the ring network transfer channel 102 (Y in S40) and when the blocking function of the frame discarding unit 44 in the receiving port is disabled (N in S42), or when the blocking function is enabled (Y in S42) but the received frame is a pass test frame (Y in S44), the receiving port transfers the received frame to the output port via the switching unit 40 (S46). When the blocking function is enabled and the received frame is not a pass test frame (N in S44), the received frame is discarded (S48). When the non-pass test frame is discarded (Y in S50), the discard information is recorded (S52). When a user frame is discarded (N in S50), S52 is skipped. When an Ethernet frame is not acquired from the ring network (N in S40), S42-S52 are skipped.

When the EAST-side I/F unit 34 or the WEST-side I/F unit 36 (also referred to as "transmission ports" in this paragraph) receives the Ethernet frame transferred from the switching unit 40 (Y in S54), the unit 34 or the unit 36 sends the frame to the ring network transfer channel 102 (S56). When the frame sent is a test frame (Y in S58), the transmission port records the pass information on the test frame (S60). When the frame sent is a user frame (N in S58), S60 is skipped. When the transmission port does not receive an Ethernet frame (N in S54), S56 and the subsequent steps are skipped and the flow shown in the figure is terminated.

In the communication system 100 according to the embodiment, determination on the normality of the transfer status in the ring network is made by monitoring whether the pass test frame not designed to be discarded at the block point goes around the ring network within the wait time. This allows determination on the normality of the ring network as a whole including the out-of-operation route produced as a result of establishing a block point. By randomly configuring the payload size of the pass test frame within the permitted range of user frame size, and by configuring the payload to contain a random bit sequence, failures dependent on the frame size or failures dependent on the pattern of bit sequence can be detected. In other words, the inventive approach is capable of smoothly detecting failures that Ethernet OAM monitoring frames defined to have the frame size between 64 bytes and 100 bytes cannot detect easily, regardless of the use frame size.

By transferring a non-pass test frame in addition to a pass test frame in the ring network, the normality of the process of discarding a frame at the block point in the communication system 100 is verified. Further, since the pass information and discard information on the test frames are stored in the route node, the cause of a failure or the location of a failure can be identified easily by examining the pass information and discard information stored in the route nodes at, for example, a monitoring terminal.

Second Embodiment

The configuration of the communication system 100 according to the second embodiment of the present invention (hereinafter, also referred to as "second embodiment") is similar to that of the communication system 100 according to the first embodiment shown in FIG. 1. The difference is that the route node according to the second embodiment is provided with the function of communicating the status of the process of routing the received test frame, i.e., whether the test frame is passed or discarded, to the parent node.

Figure 10:
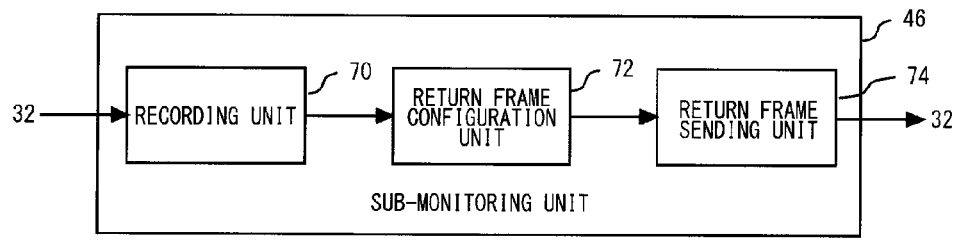
FIG. 10 is a block diagram showing the sub-monitoring unit according to the second embodiment in further detail.

FIG. 10 is a block diagram showing the sub-monitoring unit 46 of the route node according to the second embodiment in further detail. The sub-monitoring unit 46 comprises a return frame configuration unit 72 and a return frame sending unit 74. The recording unit 70 of the figure is already described with reference to FIG. 6 so that the description of the configuration is omitted. The return frame configuration unit 72 configures an Ethernet frame (hereinafter, also referred to as "return frame") indicating the status of the process of routing the received test frame.

More specifically, in the event that an update to the pass information is received from the EAST-side I/F unit 34, the return frame configuration unit 72 configures the header of the return frame such that the MAC address of the parent node is designated as the destination MAC address, and configures the type field to contain a predetermined bit sequence indicating a return frame. The unit 72 also configures the payload of the return frame to contain the sequence number of the test frame and the pass time stamp indicating that the test frame is passed, which are indicated by the update, as well as containing the ID of the local apparatus.

When the information indicating that a non-pass test frame is discarded is received from the WEST-side I/F unit 36, the return frame configuration unit 72 adds the sequence number of the non-pass test frame and the discard time stamp indicating that the non-pass test frame is discarded to the payload of the return frame of the pass test frame pairing with the non-pass test frame. When the pass information on the pass test frame pairing with the non-pass test frame is not received, the unit 72 may stand by until the pass information on the pass test frame is received.

The return frame sending unit 74 sends the return frame configured in the return frame configuration unit 72 to the receiving port of the pass test frame and causes the receiving port to send the return frame in the second direction in the ring network. Typically, the WEST-side I/F unit 36 sends the return frame since the WEST-side I/F unit 36 receives the test frame.

Figure 11:
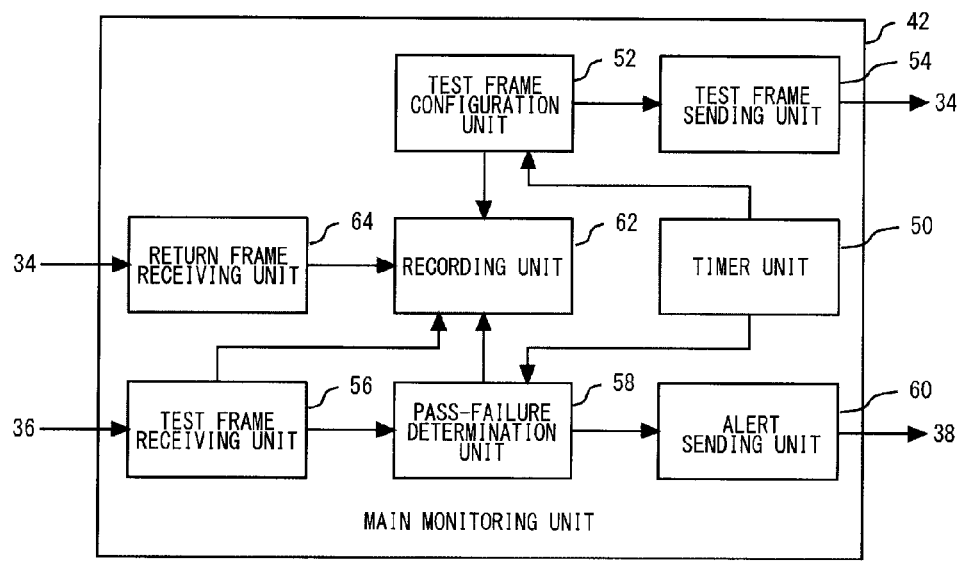
FIG. 11 is a block diagram showing the main monitoring unit according to the second embodiment in further detail.

FIG. 11 is a block diagram showing the main monitoring unit 42 of the parent node according to the second embodiment in further detail. In addition to the functional blocks of the first embodiment, the main monitoring unit 42 further comprises a return frame receiving unit 64. The functional blocks of FIG. 11 that are identical to or corresponding to the functional bocks shown in FIG. 3 are indicated by the same reference symbols as in FIG. 3. Description of the features of the functional blocks already described is omitted from the description given below.

When the EAST-side I/F unit 34 acquires a return frame from the route node via the ring network transfer channel 102, the unit 34 transfers the return frame to the main monitoring unit 42. When the return frame receiving unit 64 of the main monitoring unit 42 receives the return frame from the EAST-side I/F unit 34, the unit 64 records the ID of the route node contained in the return frame, the pass time stamp, and the discard time stamp (if it is contained) in the monitoring information in the monitoring information storage 24 using the recording unit 62.

FIG. 12 shows an example of monitoring information stored in the monitoring information storage 24 according to the second embodiment. As shown in FIG. 12, each time the return frame receiving unit 64 receives a return frame corresponding to a particular test frame, the return frame receiving unit 64 records the ID of the route node, pass time stamp, and discard time stamp in the monitoring information.

In the communication system 100 according to the second embodiment, the status of routing the test frame in the route node is communicated to the parent node and is managed according to the monitor information in the parent node in a centralized manner. This allows the cause of a failure and the location of a failure to be efficiently identified when a failure in the ring network is detected by the parent node, by examining the monitor information managed in the parent node from, for example, a monitoring terminal.

By transferring the return frame in a direction opposite to the direction of transfer of the test frame, the normality of the transfer status in the direction opposite to the direction of transfer can also be monitored. Even when the pass test frame is received or even when the timeout of the reception of the non-pass test frame occurs, the pass-failure determination unit 58 of the parent node (communication apparatus 10) may determine that the transfer status in the ring network is abnormal if at least one of the return frames is not subsequently received from the route nodes within a predetermined period of time. Difference in the direction of transfer of a communication frame may result in difference in the transfer route within the communication apparatus. The physical transfer channel in the ring network may also differ. Accordingly, exhaustiveness and precision of monitoring the normality of a ring network are improved by monitoring the status of transfer in the direction opposite to the direction of transferring the test frame in accordance with the status of receiving the return frame.

Given above is a description of the first and second embodiments of the present invention. The embodiment is intended to be illustrative only and it will be obvious to those skilled in the art that various modifications to constituting elements and processes could be developed and that such modifications are also within the scope of the present invention.

A description will be given of the first variation. In the first and second embodiments, the test frame is assumed to be transferred in the first direction in the ring network. Thus, the EAST-side I/F unit 34 of the parent node sends the test frame to the ring network and determines the transfer status in the ring network in accordance with the status of acquiring the test frame in the EAST-side I/F unit 34 via the ring network, WEST-side I/F unit 36, and switching unit 40. According to the variation, the test frame may be transferred in the second in the ring network as well as in the first direction. In other words, the WEST-side I/F unit 36 of the parent node may also send the test frame to the ring network and determines the transfer status in the ring network in accordance with the status of acquiring the test frame in the WEST-side I/F unit 36 via the ring network, EAST-side I/F unit 34, and switching unit 40. The monitoring information in the parent node may further record information indicating whether the test frame is transferred in the first direction or in the second direction.

When RTT determination and content determination on the test frame sent by the EAST-side I/F unit 34 in the first direction in the ring network and received by the WEST-side I/F unit 36 from an apparatus in the second direction in the ring network indicate normal transfer, the pass-failure determination unit 58 determines that the status of transfer in the first direction in the ring network is normal. When RTT determination and content determination on the test frame sent by the WEST-side I/F unit 36 in the second direction in the ring network and received by the EAST-side I/F unit 34 from an apparatus in the first direction in the ring network indicate normal transfer, the unit 58 determines that the status of transfer in the second direction in the ring network is normal.

According to the first variation, the normality of the status of transfer in the second direction in the ring network can be monitored in addition to the normality of the status of transfer in the first direction in the ring network. Difference in the direction of transfer of a communication frame may result in difference in the transfer route within the communication apparatus. The physical transfer channel in the ring network may also differ. For example, communication frames transferred in different directions may be transferred using different optical fibers. Accordingly, exhaustiveness and precision of monitoring the normality of a ring network are improved by transferring test frames in both directions in the ring network.

A description will now be given of the second variation.

In the first and second embodiments, the test frame is assumed to be transferred to the ring network at predetermined intervals. In this variation, the normality of the ring network may be monitored using the test frame (only) when the location of establishing a block point is changed. The parent node may detect a change in the location of a block point by communicating with another apparatus (e.g., communication using the spanning tree protocol) and automatically send the test frame. Alternatively, a maintenance operator may request the parent node to send the test frame when changing the location of a block point.

Typically, change in the location of establishing a block point occurs when a failure occurring in a ring network is addressed and then the location of the block point is returned to the location occurring before the occurrence of the failure (i.e., the location in the normal operation). By verifying the transfer status using the test frame prior to changing the location of establishing a block point, the normality of transfer status in the ring network occurring when the location of establishing a block point is changed can be verified before the change, thereby preventing a communication error associated with the resumption of the block point from occurring. By scheduling the transfer of the test frame only during a limited period of time, the communication bandwidth reserved for user frames is prevented from being heavily loaded by the transfer of test frames. The load imposed on the parent node from determining the transfer status in the ring network is also reduced.

A description will now be given of the third variation. In the first and second embodiments, the communication system 100 is assumed to have one parent node responsible for monitoring. Alternatively, the communication system 100 may be provided with multiple parent nodes. In other words, the communication apparatus 10 of FIG. 1 may function as a parent node and a route node and at least one of the communication apparatuses 12-18 may function as a parent node and a route node. The communication apparatus functioning as a parent node and a route node is provided with both the main monitoring unit 42 and the sub-monitoring unit 46. The main monitoring unit 42 processes test frames originating from the local apparatus and the sub-monitoring unit 46 processes test frames originating from another parent node.

According to the third variation, by configuring at least two of multiple communication apparatuses provided in the communication system 100 as parent nodes, the normality of the transfer route including a parent node can be monitored by referring to the transfer status of the test frame sent by another parent node. In other words, the normality of a parent node as a route node can be monitored by referring to the transfer status of the test frame sent by another parent node. This will improve exhaustiveness and precision of normality monitoring of the ring network. Also, a failure in the function of a communication apparatus as a parent node (e.g., the main monitoring unit 42) can be complemented by the parent node function in another communication apparatus. In other words, normality monitoring of the communication system 100 can be continued.

A description will now be given of the fourth variation. In the second embodiment, the discard information on the non-pass test frame is assumed to be appended to the return frame for the pass test frame paring with the non-pass test frame and transferred from the route node to the parent node. According to the variation, a new return frame for communicating the discard information on the non-pass test frame may be transmitted from the route node that discarded the non-pass test frame to the parent node. The discard information on the non-pass test frame may be contained in the new return frame. In other words, the discard information on the non-pass test frame may be communicated to the parent node using a return frame different from the return frame for communicating the pass information on the pass test frame.

A description will now be given of the fifth variation. The ring network according to the first and second embodiments is assumed to be a Layer-2 network, but the ring network may of course be a Layer-3 network. In this case, the communication apparatuses may be a Layer-3 switch or a router. The parent node may determine the normality of the transfer status in the ring network by sending an IP packet as a test frame to the ring network and monitoring the transfer status.

Optional combinations of the embodiment and the variation may also be useful as the embodiment of the present invention. The embodiment produced by the combination will have the advantages of the embodiment and the variation combined.

It will be understood by a skilled person that the functions that should be achieved by the constituting elements recited in the claims are implemented by the constituting elements indicated in the embodiments and the variations alone, or a combination of those elements.

What is claimed is:

1. A communication system provided with a plurality of communication apparatuses and configured such that a user frame sent from a user apparatus is transferred in a ring network connecting the plurality of communication apparatuses in a ring topology, wherein selected one or more of the plurality of communication apparatuses comprise:

a test frame sending unit configured to send a test frame that is not designed to be discarded at a block point in the ring network established to discard the user frame and that is configured to have a data size randomly selected from the data sizes permitted for the user frame, from a first communication port connected to a transfer channel in a first direction in the ring network; and a determination unit configured to determine that transfer status of the user frame in the ring network is normal when the sent test frame is received via a second communication port connected to a transfer channel in a second direction in the ring network in a predetermined manner;

wherein the test frame sending unit sends a frame designed to be discarded at the block point as a non-pass test frame in addition to the test frame, and the determination unit determines that the transfer status of the user frame in the ring network is normal when the test frame is acquired via the second communication port in the predetermined manner and when the non-pass test frame is not acquired via the second communication port.

2. The communication system according to claim 1, wherein the test frame sending unit randomly configures a bit sequence pattern in a payload of the test frame, when the test frame should be sent.

3. The communication system according to claim 1, wherein the communication apparatus that routes the test frame sent from the selected one or more communication apparatuses comprises:

a return frame sending unit configured to send, when the test frame is passed, a return frame indicating that the test frame is passed and destined to the selected one or more communication apparatuses, from the communication port receiving the test frame, and wherein the selected one or more communication apparatuses comprise:

a recording unit configured to record, when the return frame is received, information indicated by the frame.

4. The communication system according to claim 1, further comprising:

wherein the communication apparatus that routes the test frame sent from the selected one or more communication apparatuses comprises:

a return frame sending unit configured to send, when the test frame is passed, a return frame indicating the passage and destined to the selected one or more communication apparatuses, from the communication port receiving the test frame, and configured to send, when the non-pass test frame is discarded at the block point established in the local apparatus, a return frame indicating that the frame is discarded, and wherein the selected one or more communication apparatuses comprise:

a recording unit configured to record, when the return frame is received, information indicated by the frame.

5. The communication system according to claim 1, wherein the test frame sending unit sends the test frame from the first communication port prior to a change in the location of the block point in the ring network, and the determination unit determines that the transfer status of the user frame in the ring network where the location of the block point is changed is normal, when the test frame is acquired from the second communication port in a predetermined manner.

6. The communication system according to claim 1, wherein the test frame sending unit sends the test frame also from the second communication port, and the determination unit determines that the transfer status of the user frame in the first direction in the ring network is normal, when the test frame sent from the first communication port is received via the second communication port in a predetermined manner, and determines that the transfer status of the user frame in the second direction in the ring network is normal, when the test frame sent from the second communication port is received via the first communication port in a predetermined manner.

7. The communication system according to claim 1, wherein the communication apparatus that routes the test frame sent from the selected one or more communication apparatuses comprises a pass information storage configured to store, when the test frame is passed, information indicating the frame is passed.

8. The communication system according to claim 1, wherein the selected one or more communication apparatuses include at least two of the plurality of communication apparatuses.

9. A communication apparatus that is one of a plurality of communication apparatuses connected in a ring topology in a ring network adapted to transfer a user frame sent from a user apparatus, comprising:

a test frame sending unit configured to send a test frame that is not designed to be discarded at a block point in the ring network established to discard the user frame and that is configured to have a data size randomly selected from the data sizes permitted for the user frame, from a first communication port connected to a transfer channel in a first direction in the ring network; and a determination unit configured to determine that transfer status of the user frame in the ring network is normal when the sent test frame is received via a second communication port connected to a transfer channel in a second direction in the ring network in a predetermined manner;

wherein the test frame sending unit sends a frame designed to be discarded at the block point as a non-pass test frame in addition to the test frame, and the determination unit determines that the transfer status of the user frame in the ring network is normal when the test frame is acquired via the second communication port in the predetermined manner and when the non-pass test frame is not acquired via the second communication port.

10. The communication apparatus according to claim 9, wherein the test frame sending unit randomly configures a bit sequence pattern in a payload of the test frame, when the test frame should be sent.

11. The communication apparatus according to claim 9, further comprising:

a return frame receiving unit configured to receive a frame sent from another communication apparatus that passed the test frame and indicating that the test frame is passed; and a recording unit configured to record, when the return frame is received, information indicated by the frame.

12. The communication apparatus according to claim 9, further comprising:

a return frame receiving unit configured to receive a return frame sent from another communication apparatus that passed the test frame and indicating that the test frame is passed, and configured to receive, when the non-pass test frame is discarded at the block point established in said another communication apparatus, receive a return frame indicating that the frame is discarded; and a recording unit configured to record, when the return frame is received, information indicated by the frame.

13. The communication apparatus according to claim 9, wherein the test frame sending unit sends the test frame from the first communication port prior to a change in the location of the block point in the ring network, and the determination unit determines that the transfer status of the user frame in the ring network where the location of the block point is changed is normal, when the test frame is acquired from the second communication port in a predetermined manner.

14. The communication apparatus according to claim 9,
wherein the test frame sending unit sends the test frame also from the second communication port, and
the determination unit determines that the transfer status of the user frame in the first direction in the ring network is normal, when the test frame sent from the first communication port is received via the second communication port in a predetermined manner, and determines that the transfer status of the user frame in the second direction in the ring network is normal, when the test frame sent from the second communication port is received via the first communication port in a predetermined manner.

15. A ring network monitoring method in which selected one or more of the plurality of communication apparatuses connected in a ring topology in a ring network adapted to transfer a user frame sent from a user apparatus, the method comprising:
sending, from the selected one or more communication apparatuses, a test frame that is not designed to be discarded at a block point in the ring network established to discard the user frame and that is configured to have a data size randomly selected from the data sizes permitted for the user frame, using a first communication port connected to a transfer channel in a first direction in the ring network; and
determining, in the selected one or more communication apparatuses, that transfer status of the user frame in the ring network is normal when the sent test frame is received via a second communication port connected to a transfer channel in a second direction in the ring network in a predetermined manner;
wherein, in the sending of the test frame, a frame designed to be discarded at the block point is send as a non-pass test frame in addition to the test frame, and
in the determining of the transfer status, the transfer status of the user frame in the right network is determined to be normal when the test frame is acquired via the second communication port in the predetermined manner and when the non-pass test frame is not acquired via the second communication port.

16. The ring network monitoring method according to claim 15,
wherein, in the sending of the test frame, a bit sequence pattern is randomly configured in a payload of the test frame, when the test frame should be sent.

17. The ring network monitoring method according to claim 15,
wherein the communication apparatus that routes the test frame sent from the selected one or more communication apparatuses sends, when the test frame is passed, a return frame indicating that the test frame is passed and destined to the selected one or more communication apparatuses, from the communication port receiving the test frame, and
the selected one or more communication apparatuses records, when the return frame is received, information indicated by the frame.

18. The ring network monitoring method according to claim 15,
wherein the communication apparatus that routes the test frame sent from the selected one or more communication apparatuses sends, when the test frame is passed, a return frame indicating the passage of the frame and destined to the selected one or more communication apparatuses, from the communication port receiving the test frame, and sends, when the non-pass test frame is discarded at the block point established in the local apparatus, a return frame indicating that the frame is discarded, and
the selected one or more communication apparatuses records, when the return frame is received, information indicated by the frame.

19. The ring network monitoring method according to claim 15,
wherein the sending of the test frame sends the test frame from the first communication port prior to a change in the location of the block point in the ring network, and
the determining of the transfer status determines that the transfer status of the user frame in the ring network where the location of the block point is changed is normal, when the test frame is acquired from the second communication port in a predetermined manner.

20. The ring network monitoring method according to claim 15,
wherein the sending of the test frame sends the test frame also from the second communication port, and
the determining of the transfer status determines that the transfer status of the user frame in the first direction in the ring network is normal, when the test frame sent from the first communication port is received via the second communication port in a predetermined manner, and determines that the transfer status of the user frame in the second direction in the ring network is normal, when the test frame sent from the second communication port is received via the first communication port in a predetermined manner.

21. The ring network monitoring method according to claim 15,
wherein the communication apparatus that routes the test frame sent from the selected one or more communication apparatuses stores, when the test frame is passed, information indicating the frame is passed.

* * * * *